Aug. 3, 1954  F. W. LINDNER  2,685,345
AIR FILTER
Filed March 12, 1952
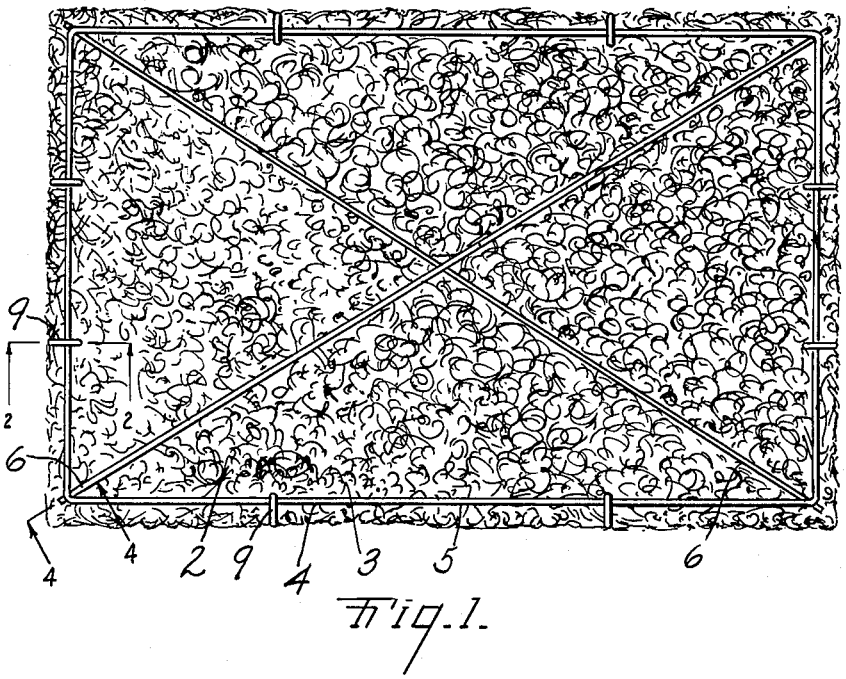
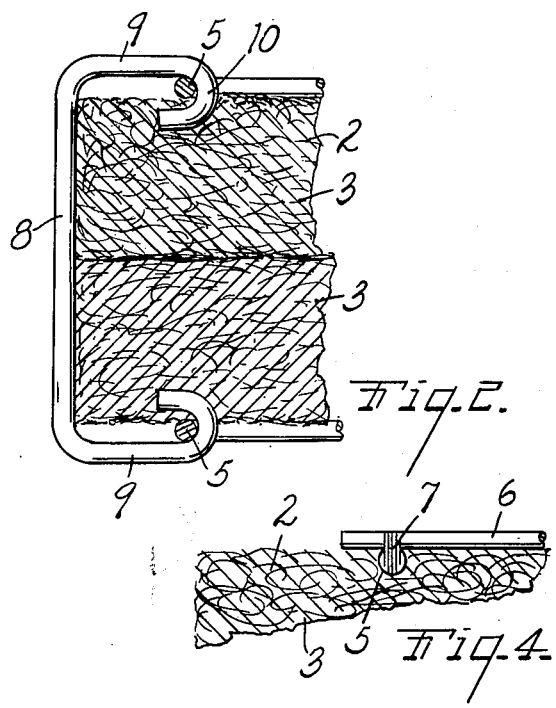
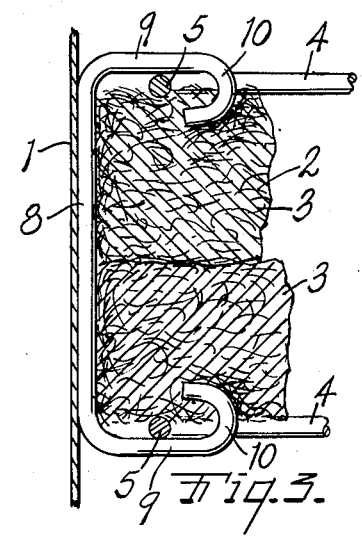
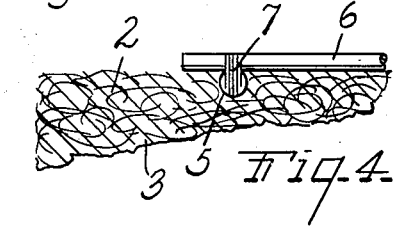
INVENTOR.
Frank W. Lindner
BY
ATTORNEY.

Patented Aug. 3, 1954

2,685,345

UNITED STATES PATENT OFFICE 2,685,345

AIR FILTER

Frank W. Lindner, Grand Rapids, Mich.

Application March 12, 1952, Serial No. 276,087

5 Claims. (Cl. 183—45)

This invention relates to improvements in air filters.

The main objects of this invention are:

First, to provide an air filter which is efficient in the filtering of air and does not require the use of oils or the like and at the same time does not objectionably impede the flow of air therethrough.

Second, to provide an air filter which is adapted to be inserted in a conduit or duct and supported therein by its inherent resilience without the necessity for additional supporting or attaching means.

Third, to provide an air filter which is adapted for use in conduits or ducts varying considerably in dimension.

Fourth, to provide an air filter which may be very economically produced and one which may be repeatedly washed or cleaned as conditions may imply.

Objects relating to details and economies of the invention will appear from the description to follow. The invention is defined and pointed out in the claims.

A preferred embodiment of the invention is illustrated in the accompanying drawing, in which:

Fig. 1 is a plan view of an air filter embodying my invention.

Fig. 2 is an enlarged fragmentary view in section on a line corresponding to 2—2 of Fig. 1.

Fig. 3 is a fragmentary sectional view corresponding generally to that of Fig. 2 with the pad shown under edgewise supporting compression with the wall of a conduit.

Fig. 4 is an enlarged fragmentary view mainly in section on a line corresponding to line 4—4 of Fig. 1.

The embodiment of my invention illustrated is designed as an air filter for ducts or conduits, a wall of which is indicated in Fig. 1. The filter illustrated is of rectangular shape.

The filter pad designated by the numeral 2, is in the embodiment illustrated, formed of two plies 3, 3. These plies are formed of loosely felted hair and are springably or resiliently compressible. Hair is a desirable material as it has substantial resilience even when loosely felted and is highly efficient in collecting dust even when quite loosely felted. The two plies are of the same dimension and as felted maintain their general shape for configuration.

On each side of the filter pad I dispose holder frames 4 comprising border frames 5 and crossed members 6. The cross members of the embodiment illustrated are diagonally disposed and are welded at their ends to the corners of the border members as indicated at 7 in Fig. 4. The border members are continuous, that is, the side and end members thereof are integrally connected. The parts 4 and 6 are desirably formed of wire. The holder frames do not materially obstruct the flow of air through the filter pad.

The two holder frames are of the same dimensions and their border members are disposed adjacent but inwardly spaced from the edges of the pad. The holder frames are held upon the filter pad by means of the inwardly facing U-shaped clips 8. The arms 9 of these clips overlap the frame border members and terminate in inturned outwardly facing open hooks 10 which embrace the border members as shown in Fig. 2, the bight portions of the clips being embedded in the edges of the filter pad as is illustrated.

The arms of the clips are engaged with the border members of the frames by compressing the filter pad through pressure applied to opposed portions of the border frames until the arms of the clips and their outwardly facing hooks can be slipped over the border members. Upon releasing the pressure the resilient filter pad material springs back to the position shown in Fig. 2 and effectively retains the frames and clips in engagement with the frames.

As stated, the filter pad material is compressible edgewise so that the filter may be inserted and self-supported in conduits or ducts of considerable variation in dimensions. This is illustrated in Fig. 3 where a wall 1 of a conduit or duct is illustrated.

The pressure on the edge of the pad when it is forced into a conduit may result in the hooks 10 moving inwardly from the border frame member 5 as shown in Fig. 3 but the pad material is still effectively retained by the clips and when the filter is removed the clips are brought back to the position shown in Fig. 2 by the resilience of the filter pad material.

In the preferred structure illustrated the filter pad is multiply which not only facilitates the making of filtering pads of varying thickness but the multiply pad is of substantial uniform density throughout. Also, the pad section may be more easily cleaned than a single piece pad of the same thickness of filter. The frames and clips can be easily removed and re-applied for convenience in cleaning the pad sections although quite effective cleaning can be done without removing the frames as they offer little obstruction to the flow of water through the pad and also do not materially obstruct the flow of air. The pad material is compressed sufficiently to retain the clips but it is not desired to compress it materially beyond that degree of compression as it is desired that there be an unobstructed flow of air throughout the whole area of the pad.

I have illustrated and described a highly practical commercial embodiment of my invention. I have not attempted to illustrate other embodiments or adaptations as it is believed that this disclosure will enable those skilled in the art to embody or adapt my invention as may be desired.

Having thus described my invention, what I claim as new and desire to secure by Letters Patent is:

1. An air filter comprising a multiply resilient compressible filter pad, the plies consisting of loosely felted hair, holder frames disposed on opposite sides of the pad and comprising continuous border members positioned with their reaches adjacent to but spaced inwardly from and in parallel relation of the edges of the pad, and diagonally crossed intermediate members fixedly secured to the frame members at the corners thereof, said border and intermediate frame members being formed of wire, and a plurality of spaced inwardly facing preformed U-shaped wire clips disposed with their arms overlapping and compressibly engaging the border frames, the arms terminating in outwardly facing inturned hooks embracing the border members of the frames, the bights of the clips being straight and being embedded in the edge of the pad, the hooks being normally retained in engagement with the border members by the resilience of the pad.

2. An air filter comprising a resilient compressible filter pad, holder frames disposed on opposite sides of the pad and comprising continuous border members positioned with their reaches adjacent to but spaced inwardly from and in parallel relation of the edges of the pad, said border members being formed of wire, and a plurality of spaced inwardly facing preformed U-shaped clips disposed with their arms overlapping and compressibly engaging the border frames, the arms terminating in outwardly facing inturned hooks embracing the border members of the frames, the bights of the clips being straight and being embedded in the edge of the pad, the hooks being normally retained in engagement with the border members by the resilience of the pad.

3. An air filter comprising a resilient compressible filter pad, holder frames disposed on opposite sides of the pad and comprising continuous border members positioned with their reaches adjacent to but spaced inwardly from and in parallel relation of the edges of the pad, said border members being formed of wire, and a plurality of spaced inwardly facing preformed U-shaped clips disposed with their arms overlapping and compressibly engaging the border frames, the arms terminating in outwardly facing inturned hooks embracing the border members of the frames, the hooks being normally retained in engagement with the border members by the resilience of the pad.

4. An air filter comprising a resilient compressible filter pad of loosely felted filaments, openwork holder frames disposed on opposite sides of the pad and comprising border members positioned with their reaches adjacent to but spaced from the edges of the pad permitting edgewise compression of the pad, and a plurality of spaced inwardly facing preformed U-shaped clips disposed with their arms overlapping and retainingly engaging the border frames, the arms terminating in open outwardly facing inturned border member engaging hooks, the bights of the clips being straight and being embedded in the edge of the pad, the hooks being normally retained in engagement with the border members by the resilience of the pad.

5. An air filter comprising a resilient compressible filter pad of loosely felted filaments, openwork holder frames disposed on opposite sides of the pad and comprising border members positioned with their reaches adjacent to but spaced inwardly from the edges of the pad permitting edgewise compression of the pad, and a plurality of spaced inwardly facing preformed U-shaped clips disposed with their arms overlapping and retainingly engaging the border frames, the arms terminating in open outwardly facing inturned border member engaging hooks.

References Cited in the file of this patent

UNITED STATES PATENTS

| Number | Name | Date |
| --- | --- | --- |
| 1,560,790 | Jordahl | Nov. 10, 1925 |
| 2,138,736 | Gaarder | Nov. 29, 1938 |
| 2,408,659 | Lamb | Oct. 1, 1946 |